US008666622B2

(12) United States Patent
Wurthner et al.

(10) Patent No.: US 8,666,622 B2
(45) Date of Patent: Mar. 4, 2014

(54) METHOD TO DEFINE A GEAR STEP FOR A SHIFTING

(75) Inventors: Maik Wurthner, Markdorf (DE);
Joachim Staudinger, Ravensburg (DE);
Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 252 days.

(21) Appl. No.: 13/187,054

(22) Filed: Jul. 20, 2011

(65) Prior Publication Data
US 2012/0072085 A1    Mar. 22, 2012

(30) Foreign Application Priority Data

Sep. 22, 2010    (DE) .......................... 10 2010 041 188

(51) Int. Cl.
*G06F 7/70*    (2006.01)
(52) U.S. Cl.
USPC .......................................................... 701/60
(58) Field of Classification Search
USPC .............................. 701/51, 55, 56, 58–61, 64
See application file for complete search history.

(56) References Cited

U.S. PATENT DOCUMENTS

| 4,947,331 | A |   | 8/1990 | Speranza |
| 5,115,698 | A | * | 5/1992 | Leising et al. ................. 475/65 |
| 5,121,657 | A |   | 6/1992 | Asada |
| 5,211,080 | A | * | 5/1993 | Leising et al. ................. 475/123 |
| 5,291,802 | A | * | 3/1994 | Kuriyama ..................... 477/109 |
| 6,098,002 | A |   | 8/2000 | Horiguchi et al. |
| 7,559,875 | B2 |  | 7/2009 | Steinhauser et al. |

FOREIGN PATENT DOCUMENTS

| DE | 41 24 549 A1 | 2/1992 |
| DE | 43 26 182 A1 | 2/1994 |
| DE | 196 00 914 A1 | 7/1997 |
| DE | 698 15 183 T2 | 11/2003 |
| DE | 10 204 002 813 A1 | 8/2005 |
| DE | 10 2005 052 824 A1 | 3/2007 |
| JP | 63-101549 A | 5/1988 |

* cited by examiner

*Primary Examiner* — Behrang Badii
*Assistant Examiner* — Daniel L Greene
(74) *Attorney, Agent, or Firm* — Davis & Bujold, PLLC; Michael J. Bujold

(57) ABSTRACT

A method of determining the size of a gear interval from a currently engaged gear to a target gear in a transmission. The method includes the steps of, for each current gear and for each possible gear interval from the current gear, recording a limit value for an acceleration or a deceleration in the target gear corresponding to the current gear and the respective gear interval used; for the current gear, starting with the smallest gear interval, applying a loop with successive increases of the gear interval to determine, depending on the current driving situation and characteristic parameters of the vehicle, the acceleration or the acceleration theoretically obtainable in the target gear produced by using the gear interval, which is compared with the respective recorded limit value until the acceleration or the deceleration theoretically obtainable no longer contravenes the limit value. The gear interval is then selected for a gearshift.

11 Claims, 2 Drawing Sheets

METHOD TO DEFINE A GEAR STEP FOR A SHIFTING

This application claims priority from German patent application serial no. 10 2010 041 188.4 filed Sep. 22, 2010.

FIELD OF THE INVENTION

The invention concerns a method for determining a gear step for a gearshift operation in a multi-gear automatic or semi-automatic variable-speed transmission of a motor vehicle.

BACKGROUND OF THE INVENTION

In semi-automatic or automatic variable-speed transmissions, shifting operations or gearshifts from a currently engaged gear to a target gear are carried out over either one gear step or over several gear steps. The number of gear steps or gears between a currently engaged gear and a target gear in a gearshift operation to be carried out determines the size of the gear step of the gearshift to be carried out.

From DE 10 2005 052 824 A1 it is already basically known that a gearshift from a currently engaged gear to a target gear can be carried out over several gear steps, and this either as a direct shift in a single step or as a combination with a plurality of gearshifts taking place in succession one after another. However, although gearshifts with gear steps of different size are basically known, the specific selection or determination of a gear step, i.e. the determination of the size of a gear step from a currently engaged gear to a target gear remains open in the prior art.

To determine a gear step, namely to determine a gear step from a currently engaged gear to a target gear, the procedure adopted in practice is that by virtue of a performance characteristic the size of the gear step is determined as a function of a driving resistance of the motor vehicle. For this, the driving resistance can be determined by computation or by measurement. In practice, when a suitable gear step has been determined for a currently engaged gear and a current driving resistance on the basis of a performance characteristic, the corresponding gearshift operation is carried out when a so-termed shifting rotational speed has been reached.

This procedure known from prior practice for determining the size of a gear step, which is carried out as a function of the currently engaged gear and as a function of the current driving resistance with reference to the performance characteristic, has the disadvantage that different performance characteristics have to be prepared and stored for different drive aggregates. Thus, a performance characteristic for one drive aggregate cannot simply be used with another drive aggregate of different power. This fact increases the cost and effort of matching up in the case of transmissions that can be used with a variety of drive aggregates.

SUMMARY OF THE INVENTION

Starting from there, the present invention addresses the problem of providing a new type of method for determining a gear step for a gearshift operation in a multi-gear automatic or semi-automatic variable-speed transmission of a motor vehicle.

The method according to the invention comprises at least the following steps: a) for each currently engaged gear and for each possible gear step starting from the currently engaged gear concerned, a limit value of an acceleration or deceleration in the target gear corresponding to the currently engaged gear and the gear step concerned is recorded; b) for the currently engaged gear, starting with the smallest gear step, a loop with successive increases of the gear step is applied to determine, depending on the current driving situation of the motor vehicle and as a function of characteristic parameters of the motor vehicle, the acceleration or deceleration that would theoretically be obtainable in the target gear reached if the gear step concerned were used, and this is compared with the respective limit value stored, until the theoretical acceleration or deceleration obtained with the gear step no longer contravenes the limit value stored for the same, and the gear step is then selected for the shifting operation.

The present invention thus proposes a completely new type of method for determining the size of a gear step from a currently engaged gear to a target gear in an automatic or semi-automatic variable-speed transmission. Since, in the method according to the invention, the power that can be provided by a drive aggregate is taken into account, there is no longer any need to determine each time a new characteristic curve for different drive aggregates, as is necessary in the prior art.

Preferably, the theoretical acceleration or the theoretical deceleration obtained by shifting from the currently engaged gear using the gear step concerned to reach the target gear, is computed from a calculated traction force or a calculated thrust force in the target gear reached with the gear step concerned, from a current driving resistance of the motor vehicle and from a current mass of the motor vehicle, in such manner that the traction force or thrust force in the target gear reached with the gear step concerned is calculated from a maximum available traction torque of a drive aggregate or a maximum available thrust torque of the drive aggregate and/or a retarder, preferably also taking into account a gear ratio of the target gear reached with the gear step concerned and an axle ratio of the motor vehicle and a tire radius of the motor vehicle.

According to an advantageous further development of the invention, the maximum available traction torque of a drive aggregate or the maximum available thrust torque of the drive aggregate is determined as a function of a target rotational speed in the target gear reached with the gear step concerned and as a function of a traction load characteristic or thrust load characteristic of the drive aggregate, in such manner that the target speed in the target gear reached with the gear step concerned is preferably calculated from a current speed of the drive aggregate in the currently engaged gear, from a gear ratio of the currently engaged gear, from the gear step concerned and from a calculated rotational speed loss during the shifting operation.

BRIEF DESCRIPTION OF THE DRAWING

Preferred further developments of the invention emerge from the subordinate claims and the description given below. An example embodiment of the invention, to which it is not limited, is explained in more detail with reference to FIG. 1, which shows a schematic representation of a drive-train of a motor vehicle, with which the method according to the invention can be used.

DETAILED DESCRIPTION OF THE PREFERRED EMBODIMENTS

The present invention concerns a method for determining a gear step for a gearshift operation in a multi-gear automatic or semi-automatic variable-speed transmission of a motor vehicle, namely for determining the size of a gear step from a currently engaged gear to a target gear.

Figure 1:
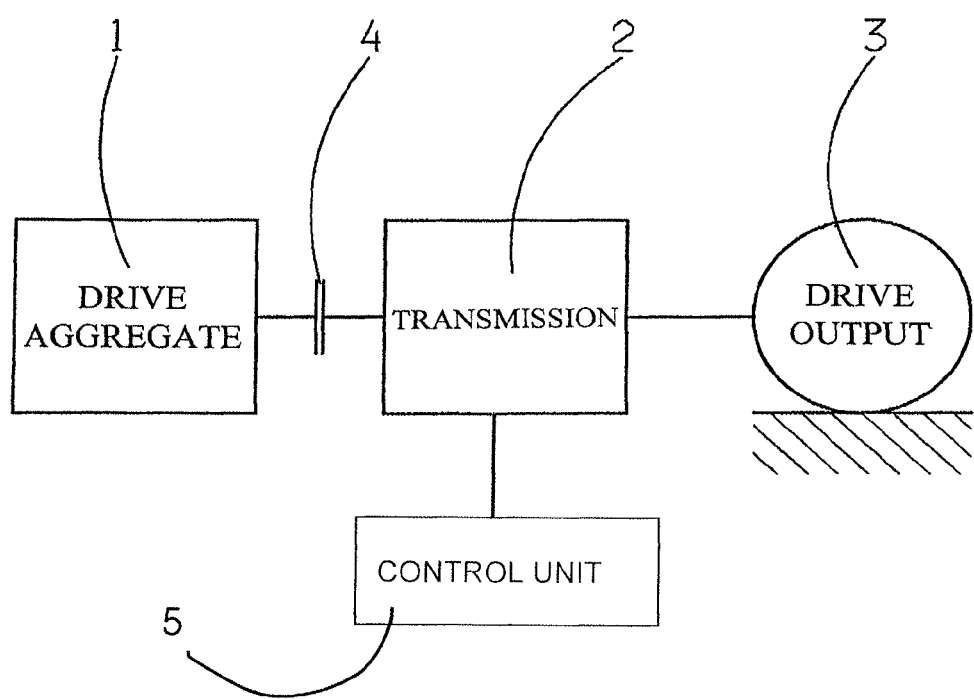

FIG. 1 shows in very schematic form a drive-train layout of a motor vehicle in which the method according to the invention can be used, the drive-train of FIG. 1 comprising a drive aggregate 1, a transmission 2 and a drive output 3. The transmission 2 is connected between the drive aggregate 1 and the drive output 3. The transmission 2 is an automatic or semi-automatic variable-speed transmission. In the drive-train of FIG. 1, between the drive aggregate 1 and the automatic or semi-automatic variable-speed transmission 2 is connected a clutch 4. When the clutch 4 is engaged, the drive aggregate 1 is coupled, via the transmission 2, to the drive output 3. As already explained, the transmission 2 is an automatic or semi-automatic, multi-gear variable-speed transmission, for example having six gears or eight gears or even 16 gears. In such a transmission 2, if a shifting operation or gearshift from a currently engaged gear to a target gear is to be carried out, then the size of the gear step is determined automatically by a control unit 5, in particular by a transmission control unit of the transmission 2.

Figure 2:
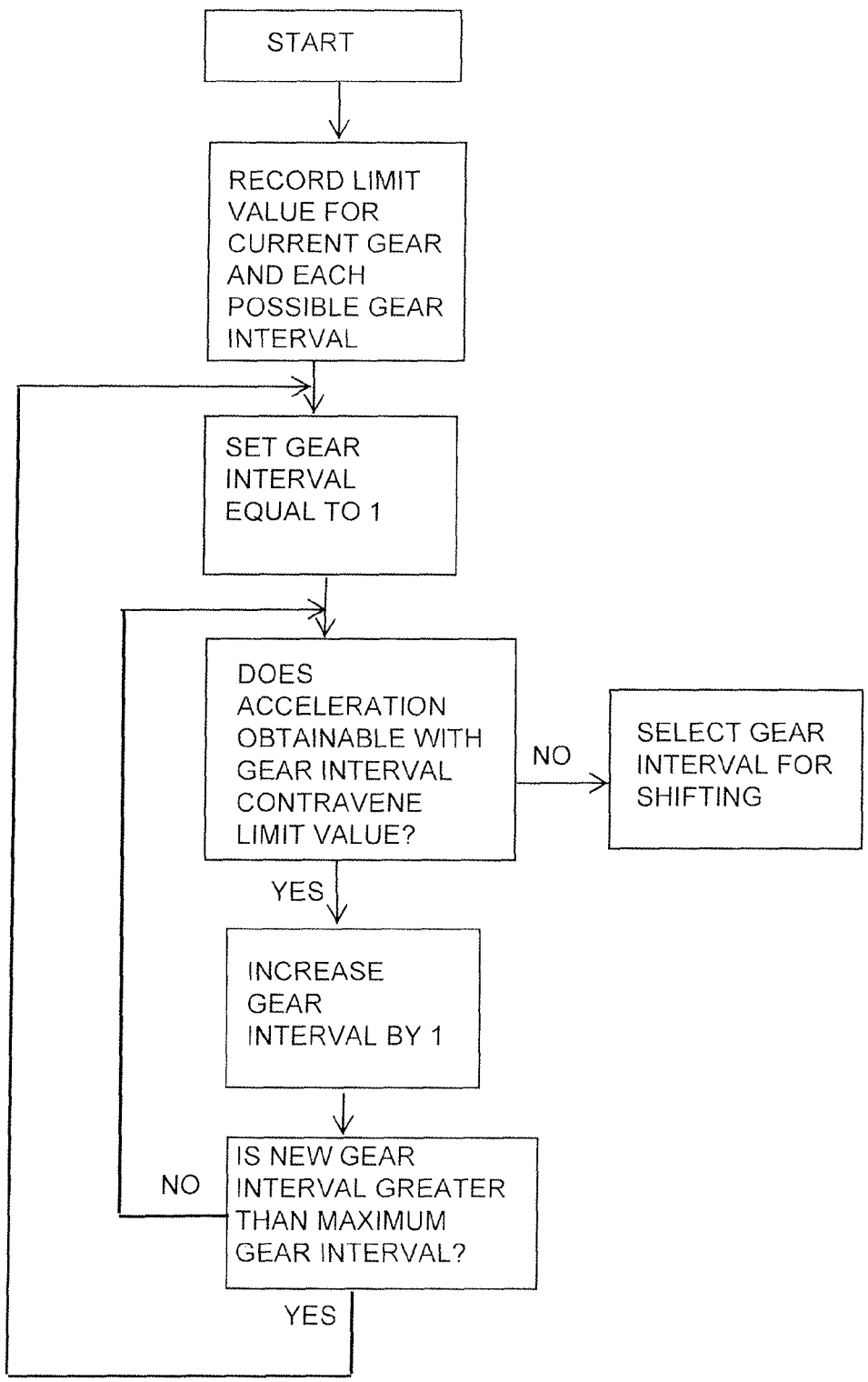
FIG. 2, which shows a flow chart of one embodiment of the method according to the invention.

The present invention now concerns a method with the help of which the size of a gear step from a currently engaged gear to a target gear of a shifting operation to be carried out can be determined automatically in a particularly advantageous manner. An embodiment of this method is shown in FIG. 2.

According to the invention, for every currently engaged gear and for every possible gear step from the currently engaged gear to a possible target gear, a limit value of an acceleration or deceleration in the target gear corresponding to the currently engaged gear and the gear step concerned is recorded.

The table below shows an example of this for an automatic or semi-automatic variable-speed transmission with eight forward gears, such that in the example illustrated by the table, for each of the eight gears in principle a gear step of up to four gear steps is possible.

For a downshift, a gear step of 1 when currently in gear 6 means a gearshift to the target gear 5. A downshift with a gear step of 2 when currently in gear 6 means a gearshift to the target gear 4.

|  | Gear step 1 | Gear step 2 | Gear step 3 | Gear step 4 |
| --- | --- | --- | --- | --- |
| Current gear 1 | 0.36 | −0.45 | −0.45 | −0.45 |
| Current gear 2 | 1.36 | −0.45 | −0.45 | −0.45 |
| Current gear 3 | 0.50 | −0.45 | −0.45 | −0.45 |
| Current gear 4 | −0.01 | −0.10 | −0.20 | −0.20 |
| Current gear 5 | −0.25 | −0.41 | −0.41 | −0.45 |
| Current gear 6 | −0.36 | −0.45 | −0.45 | −0.45 |
| Current gear 7 | −0.36 | −0.45 | −0.45 | −0.45 |
| Current gear 8 | −0.36 | −0.45 | −0.45 | −0.45 |

In the above table, for all eight of the possible currently engaged gears and for the respective, permissible gear steps, limit values for accelerations or decelerations in the respective target gear corresponding to the currently engaged gear and the gear step concerned are recorded. These limit values for an acceleration or deceleration are limit values used in the case of traction downshifts. For thrust downshifts, thrust upshifts or traction upshifts, individual limit values for accelerations and decelerations are recorded. In the table above, the limit value for an acceleration or deceleration when in the currently engaged gear 6 and with a gear step of 2 is "−0.45" for the corresponding target gear 4. The limit value for the deceleration or acceleration in the currently engaged gear 6 with a gear step of 1, i.e. for the corresponding target gear 5, is "−0.36".

The above limit values for accelerations and decelerations in the target gears that correspond to the respective currently engaged gears and the respective gear steps are stored in a transmission control unit of the transmission 2.

Now, in order to determine a gear step, namely the size of a gear step from a currently engaged gear to a target gear, starting with the respective smallest gear step for the currently engaged gear a loop with successive increases of the gear step is applied to determine, depending on the current driving situation of the motor vehicle and as a function of characteristic parameters of the same, the acceleration or deceleration that would theoretically be obtainable in the target gear reached if the gear step concerned were used, and this theoretically obtained acceleration or deceleration is compared with the respective limit values stored, namely by applying the loop until the acceleration or deceleration theoretically obtained with the respective gear step no longer contravenes the limit value stored for the same, and the gear step is then selected for a gearshift operation and used when a shifting rotational speed has been reached.

Below, the determination of the acceleration and deceleration theoretically obtained in the target gear concerned when the respective gear step is used, will be explained in detail.

The acceleration or the deceleration $a_{ZG}$ theoretically obtained in the respective target gear when starting from a currently engaged gear and using the gear step concerned, is calculated from the following equation:

$$a_{ZG} = \frac{F_{ZG} - F_{FW}}{m}$$

in which $F_{ZG}$ is a traction force or thrust force calculated for the target gear, $F_{FW}$ is the current driving resistance of the motor vehicle and m is the current mass of the motor vehicle.

The driving resistance $F_{FW}$ of the motor vehicle can be determined by measurement or by computation.

For example, if a motor vehicle has an inclination sensor, the driving resistance on an uphill or downhill gradient being driven upon at the time can be determined by measurement. If no inclination sensor is built into the motor vehicle, the driving resistance can again be determined, but by computation.

The vehicle mass m of the motor vehicle can be a fixed, specified vehicle mass, or in the case of a utility vehicle, it can be a vehicle mass determined by computation.

The traction force $F_{ZG}$ in the target gear required for calculating the acceleration or the deceleration theoretically obtained in the target gear when starting from the currently engaged gear and using the gear step concerned, is preferably calculated in such manner that the traction force or thrust force in the target gear produced by the gear step concerned is computed from a maximum available traction torque of the drive aggregate or a maximum available thrust torque of the drive aggregate and/or a retarder of the motor vehicle.

In doing this, the gear ratio of the target gear produced by the gear step concerned, an axle ratio of the motor vehicle and a dynamic tire radius of the motor vehicle are preferably also taken into account.

Consequently, the traction force or thrust force available in the target gear produced by a gear step is determined as a function of the gear ratio of the target gear, as a function of the axle ratio of the motor vehicle, as a function of the dynamic tire radius of the motor vehicle, as a function of the maximum traction torque or thrust torque available in the target gear, and preferably as a function of known losses, such as known friction losses in the drive aggregate.

Starting from a currently engaged gear and using the gear step concerned, the maximum traction torque of the drive aggregate or the maximum thrust torque of the drive aggregate in the target gear reached is preferably determined as a function of a target rotational speed of the target gear produced by the gear step concerned and as a function of a characteristic performance curve of the drive aggregate, namely as a function of a traction load or thrust load characteristic also known as the characteristic of the motor under full load.

The target speed of the target gear produced by using the gear step concerned is calculated from a current rotational speed of the drive aggregate, from a gear ratio of the currently engaged gear, from the gear step concerned and from a speed loss of the drive aggregate during the gearshift operation to be carried out, the speed loss being provided by virtue of a shifting strategy of the transmission control unit typically as a calculated quantity.

Accordingly, as a function of a current motor speed in the currently engaged gear, the gear ratio of the currently engaged gear, a gear step and a speed loss during a gearshift operation, a target rotational speed of the target gear of the gearshift operation to be carried out can be computed and from the target speed of the target gear and a characteristic curve of the drive aggregate, a maximum traction torque or thrust torque that can be provided by the drive aggregate is determined. Depending on the maximum motor torque available, the known motor losses, the gear ratio of the gear step, the rear axle ratio and a dynamic tire radius, the traction or thrust force that can be obtained in a target gear can be determined. This traction or thrust force in the target gear is set against a driving resistance and a mass of the motor vehicle in order to calculate the acceleration or deceleration that can theoretically be obtained in the target gear produced by starting from a currently engaged gear and using the gear step concerned. The theoretically obtainable deceleration or acceleration is compared with the corresponding stored limit value, and if this limit value is contravened by the acceleration or deceleration theoretically obtainable, the gear step concerned is rejected and the calculation is repeated with the next-largest gear step, namely successively in the manner of a loop, until the acceleration or deceleration theoretically obtainable no longer contravenes the corresponding stored limit value. That gear step is then selected for the gearshift operation and is used when the shifting speed is reached.

In a specific example embodiment let it be assumed that a motor vehicle currently has gear 6 engaged, and that its current driving resistance is 45,000 N. Further, it is assumed that the current mass of the vehicle is 40,000 kg, and with a gear step of 1 the traction force available in the corresponding target gear 5 is 20,000 N. Thus, with gear step 1 a deceleration of −0.625 would theoretically be obtained, but this deceleration is below the stored limit value of −0.36 and therefore contravenes it.

Accordingly, the gear step 1 is rejected. Furthermore, by successively increasing the gear step, i.e. next with gear step 2, the acceleration theoretically obtained is recalculated and assuming that for gear step 2 a traction force of 30,000 N is available in the corresponding target gear 4, a theoretical deceleration of −0.375 is obtained for the target gear 4, and this theoretical deceleration is higher than the corresponding limit value of −0.45 and therefore does not contravene the limit value. Thus in this case, starting from the currently engaged gear 6 a gear step of 2 and therefore the target gear 4 is selected for a traction downshift, which is then carried out when the corresponding rotational speed of the traction downshift has been reached.

Since in the method according to the invention gear steps are selected on the basis of stored acceleration and deceleration limit values that take into account a maximum motor torque that can be provided by the drive aggregate 1, the limit values stored in the control unit for the decelerations or accelerations can be used without newly matching to various drive aggregates with different motor powers.

Depending on the specific limits selected for decelerations and accelerations, when gearshift operations are carried out, for example when traction downshifts are carried out, the motor vehicle can be further decelerated even after a gearshift operation has been carried out, which may be desired in some circumstances. Alternatively, after carrying out a gearshift operation a surplus of traction force may be available in order to enable an acceleration in the gears.

Indexes

1 Drive aggregate
2 Transmission
3 Drive output
4 Clutch

The invention claimed is:

1. A method of determining a gear interval for a gearshift operation in one of a multi-gear automatic or semi-automatic variable-speed transmission of a motor vehicle to determine a size of a gear interval from a currently engaged gear to a target gear, the method comprising the steps of:

recording a limit value, via a control unit, for a currently engaged gear and for each possible gear interval from the currently engaged gear concerned, for one of an acceleration or a deceleration into the target gear corresponding to the respective currently engaged gear and the respective gear interval;

applying a loop, via the control unit, which successive increases of the gear interval for the currently engaged gear, starting with a smallest gear interval, to determine as a function of a current driving situation of the motor vehicle and as a function of characteristic parameters of the motor vehicle, the one of the acceleration and the deceleration theoretically obtainable in the target gear produced by using the gear interval concerned, and comparing this with the respective recorded limit value until the one of the acceleration and the deceleration theoretically obtainable no longer contravenes the limit value, and then selecting the gear interval concerned for the gearshift operation; and then shifting the transmission using the gear interval selected by the control unit.

2. The method according to claim 1, further comprising the step of determining a gear interval for a traction downshift of a motor vehicle being driven on an uphill gradient, and the limit value of the one of the acceleration or the deceleration in the target gear corresponding to the currently engaged gear concerned and the gear interval concerned being contravened if the one of the acceleration or the deceleration theoretically obtainable in the target gear produced by using the gear interval concerned is lower than the limit value.

3. The method according to claim 1, further comprising the step of computing, starting from the currently engaged gear and using the respective gear interval, one of the acceleration and the deceleration theoretically obtainable in the target gear produced from one of a calculated traction force and a calculated thrust force in the target gear reached by the gear interval concerned, from a current driving resistance of the motor vehicle and from a current mass of the motor vehicle.

4. The method according to claim 3, further comprising the step of determining the current driving resistance of the motor vehicle from one of a downhill gradient and an uphill gradient on which the motor vehicle is being driven.

5. The method according to claim 3, further comprising the step of one of measuring and computing the current driving resistance of the motor vehicle.

6. The method according to claim 3, further comprising the step of calculating the current mass of the motor vehicle.

7. The method according to claim 3, further comprising the step of computing one of the traction force and the thrust force in the target gear produced by the gear interval concerned from one of a maximum available traction torque of a drive aggregate and a maximum available thrust torque of at least one of the drive aggregate and a retarder.

8. The method according to claim 7, further comprising the step of, when computing the one of the traction force and the thrust force, taking into account a gear ratio of the target gear produced by the gear interval concerned, an axle ratio of the motor vehicle and a tire radius of the motor vehicle.

9. The method according to claim 7, further comprising the step of determining the one of the maximum available torque of the drive aggregate and the maximum available thrust torque of the drive aggregate as a function of a target rotational speed of the target gear produced by the gear interval concerned and as a function of either a traction load characteristic or a thrust load characteristic of the drive aggregate.

10. The method according to claim 9, further comprising the step of computing the target rotational speed of the target gear produced by the gear interval concerned from a current speed of the drive aggregate in the currently engaged gear, from a gear ratio of the currently engaged gear, from the gear interval concerned and from a calculated rotational speed loss during the gearshift operation.

11. A method of determining a gear interval for a gearshift operation in one of a multi-gear automatic or semi-automatic variable-speed transmission of a motor vehicle to determine a size of a gear interval from a currently engaged gear to a target gear, the method comprising the steps of:

recording a limit value, via a control unit, for a currently engaged gear and for each of a plurality of possible gear intervals from the currently engaged gear concerned, for one of an acceleration or a deceleration into the target gear corresponding to the respective currently engaged gear and the respective gear interval;

using a loop, via the control unit, which successive increases of the gear interval for the currently engaged gear, starting with a gear interval of 1 and successively increasing the gear interval to a next higher gear interval to determine, as a function of a current driving situation of the motor vehicle and as a function of characteristic parameters of the motor vehicle, the one of the acceleration and the deceleration theoretically obtainable in the target gear produced by using the successively increased gear interval, and comparing this with the respective recorded limit value, until the one of the theoretically obtainable acceleration and the deceleration theoretically obtainable no longer contravenes the limit value;

then the control unit selecting the gear interval concerned for the gearshift operation; and performing the gearshift operation in the transmission when a corresponding speed for the shift is reached.

* * * * *